(12) United States Patent
Chen

(10) Patent No.: US 9,469,499 B1
(45) Date of Patent: Oct. 18, 2016

(54) RETRACTABLE CABLE COMBINED WITH SMARTPHONE/TABLET HOLDER

(71) Applicant: Huei-Mei Chen, New Taipei (TW)

(72) Inventor: Huei-Mei Chen, New Taipei (TW)

(*) Notice: Subject to any disclaimer, the term of this patent is extended or adjusted under 35 U.S.C. 154(b) by 0 days.

(21) Appl. No.: 14/967,401

(22) Filed: Dec. 14, 2015

(51) Int. Cl.
| | | |
|---|---|---|
| *B65H 75/44* | (2006.01) | |
| *B65H 75/48* | (2006.01) | |
| *H04M 1/04* | (2006.01) | |
| *H04B 1/3888* | (2015.01) | |
| *H01R 13/72* | (2006.01) | |

(52) U.S. Cl.
CPC .......... *B65H 75/4471* (2013.01); *B65H 75/48* (2013.01); *H01R 13/72* (2013.01); *H04B 1/3888* (2013.01); *H04M 1/04* (2013.01)

(58) Field of Classification Search
CPC ... B65H 75/4471; B65H 75/48; H04M 1/04; H04B 1/3888; H01R 13/72
See application file for complete search history.

(56) References Cited

U.S. PATENT DOCUMENTS 3,773,987 A * 11/1973 Davis ................. B65H 75/4431
191/12.4
2016/0094262 A1* 3/2016 Chorny ................. H04B 1/385
455/575.6

* cited by examiner

*Primary Examiner* — Joseph Dean, Jr.

(57) ABSTRACT

A retractable cable combined with a smartphone/tablet holder contains: a roller and a removable support connected with the roller, and the roller includes a casing, a rotatable disc, a spiral torsion spring, and a data transfer cable. The casing includes a first cover and a second cover which are connected together to define an accommodation space so as to house the rotatable disc in which the spiral torsion spring is fixed, and the data transfer cable inserts through and rolls on the rotatable disc. A USB plug of the data transfer cable is accommodated beside a connecting piece of the first cover, and a terminal portion of the data transfer cable is housed on a second joining sheet of the second cover. Preferably, the terminal portion of the data transfer cable matches with a USB slot of a smartphone or a tablet.

4 Claims, 10 Drawing Sheets

RETRACTABLE CABLE COMBINED WITH SMARTPHONE/TABLET HOLDER

FIELD OF THE INVENTION

The present invention relates to a retractable cable combined with a smartphone/tablet holder in which a USB plug of a data transfer cable is accommodated beside a connecting piece of a first cover, and a terminal portion of the data transfer cable is housed on a second joining sheet of a second cover.

BACKGROUND OF THE INVENTION

A conventional smartphone holder is configured to support a smartphone or a tablet, but as charging electricity to the smartphone or the tablet, a data transfer cable cannot be retracted into the conventional smartphone holder, thus damaging the data transfer cable easily.

The data transfer cable is pulled out of a casing of a conventional transfer cable roller and is retraced into the transfer cable roller by using a spiral torsion spring fixed in the transfer cable roller. However, the conventional transfer cable roller cannot support the smartphone.

The present invention has arisen to mitigate and/or obviate the afore-described disadvantages.

SUMMARY OF THE INVENTION

The primary objective of the present invention is to provide a retractable cable combined with a smartphone/tablet holder in which a USB plug of a data transfer cable is accommodated beside a connecting piece of a first cover, and a terminal portion of the data transfer cable is housed on a second joining sheet of a second cover.

To obtain the above objective, a retractable cable combined with a smartphone/tablet holder provided by the present invention contains: a roller and a removable support connected with the roller, and the roller including a casing, a rotatable disc, a spiral torsion spring, and a data transfer cable.

The removable support includes a first fixing plate, a second fixing plate, a connection plate, and a plurality of shafts.

The casing includes a first cover and a second cover which are connected together to define an accommodation space so as to house the rotatable disc in which the spiral torsion spring is fixed, and the data transfer cable inserts through and rolls on the rotatable disc.

The first cover includes a central column disposed on a central position and inserting through the rotatable disc, a slot defined on a central position of the central column, a connecting piece mounted on a front end thereof, and a connection block arranged on a rear end thereof; the connecting piece has plural first coupling pegs arranged on a peripheral side thereof, the connection block has plural orifices defined on a peripheral side thereof, and a first cap is formed on a bottom thereof and has a first recess formed on a bottom thereof.

The second cover includes a second cap formed on a top thereof and having a second recess defined on a front end thereof, plural apertures defined on a front end thereof, a first joining sheet, a second joining sheet, a receiving space defined between the first joining sheet and the second joining sheet, a dovetail groove formed on a rear end of the first joining sheet so as to accommodate a dovetail protrusion, and plural second coupling pegs arranged on a distal end of each of the first joining sheet and the second joining sheet.

The rotatable disc includes a cylindrical body, a hollow housing groove defined therein, a through hole formed on a central position thereof, a first trough defined on a first side of the cylindrical body, a second trough formed on a second side of the cylindrical body, and a third trough arranged beside the first trough.

The spiral torsion spring is housed in the housing groove and includes a first segment retained on the slot of the central column, a second segment engaged on the third trough of the cylindrical body.

A first end of the data transfer cable extends out of the first recess through the cylindrical body and the second trough, and a second end of the data transfer cable extends out of the second recess via the first trough and the cylindrical body, such that the data transfer cable rolls on the rotatable disc; the data transfer cable includes a USB plug fixed on the second end thereof and includes a terminal portion secured on the first end thereof.

The removable support includes the dovetail protrusion disposed on a middle portion of a front end of the connection plate, a first trench defined on a first side thereof and rotatably connecting with the first fixing plate by using the plurality of shafts, a second trench formed on a second side thereof and rotatably connecting with the second fixing plate by way of the plurality of shafts, wherein the first fixing plate has a first rotary tab formed on a rear end thereof and has a first notch defined on a front end thereof, and the rotary tab has a first opening defined thereon; the second fixing plate has a second rotary tab formed on a rear end thereof and has a second notch defined on a front end thereof, and the second rotary tab has a second opening defined thereon.

DETAILED DESCRIPTION OF THE FIRST EMBODIMENTS

Figure 1:
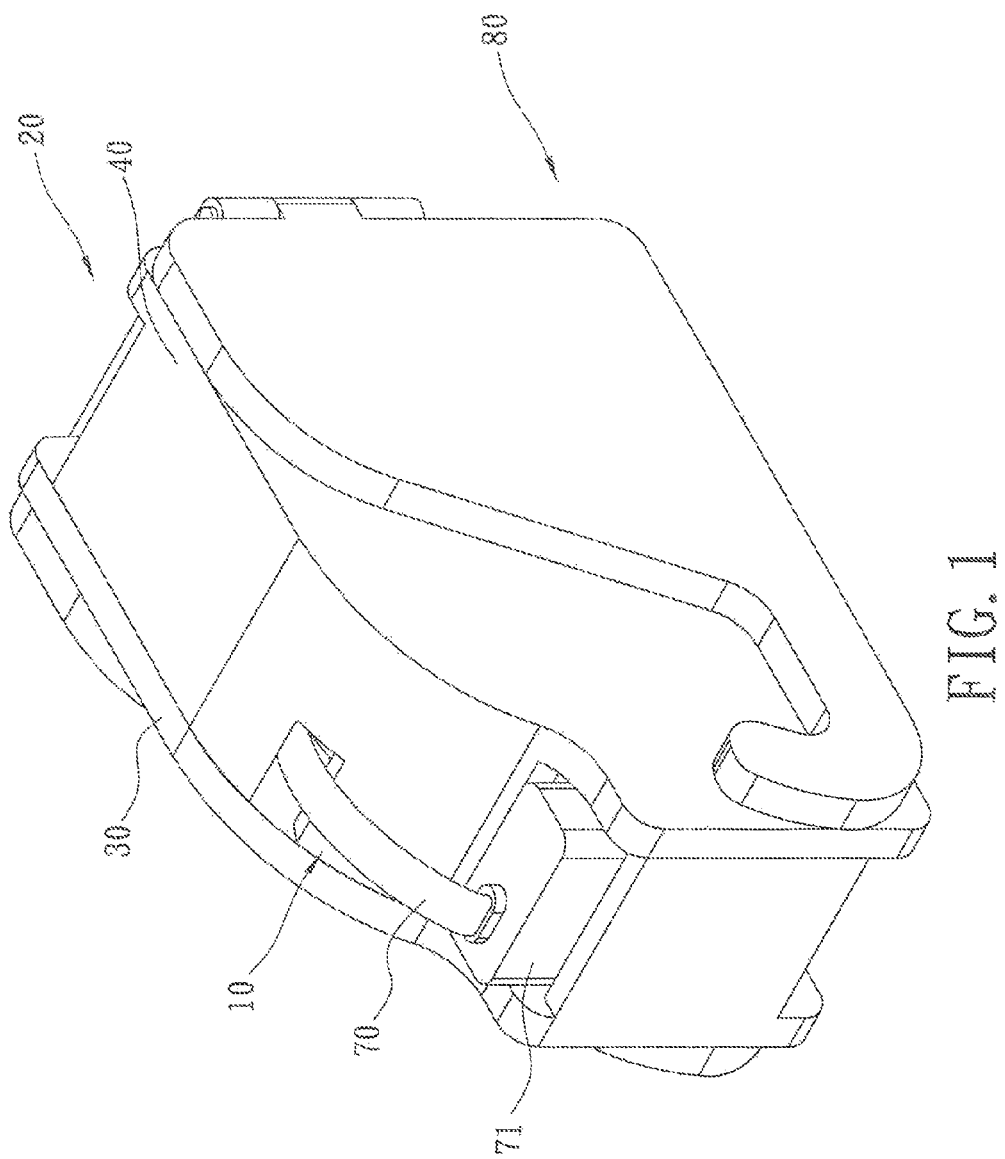
FIG. 1 is a perspective view showing the assembly of a retractable cable combined with a smartphone/tablet holder according to a preferred embodiment of the present invention.
Figure 2:
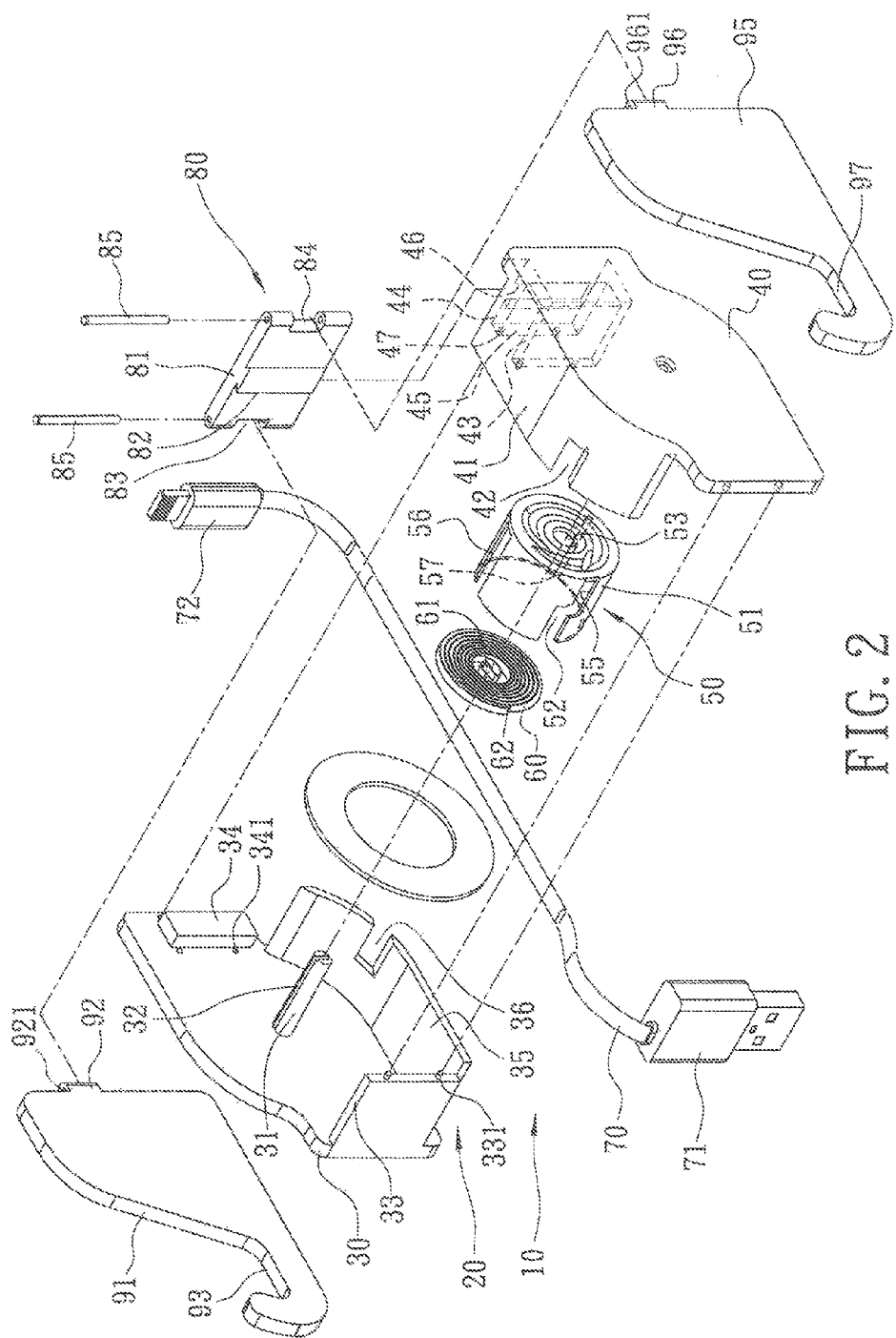
FIG. 2 is a perspective view showing the exploded components of the retractable cable combined with the smartphone/tablet holder according to the preferred embodiment of the present invention.
Figure 3:
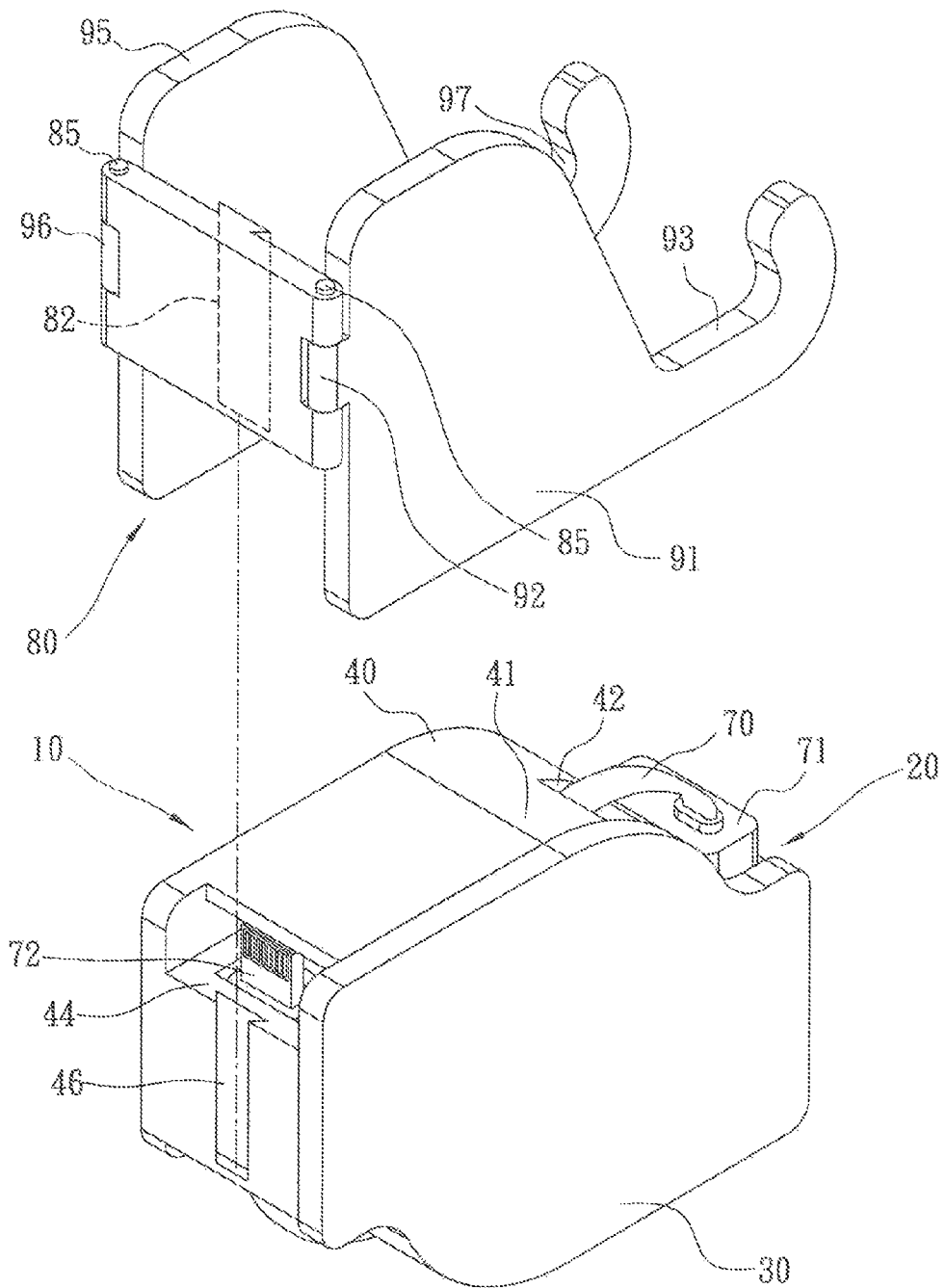
FIG. 3 is a perspective view showing the exploded components of a part of the retractable cable combined with the smartphone/tablet holder according to the preferred embodiment of the present invention.
Figure 4:
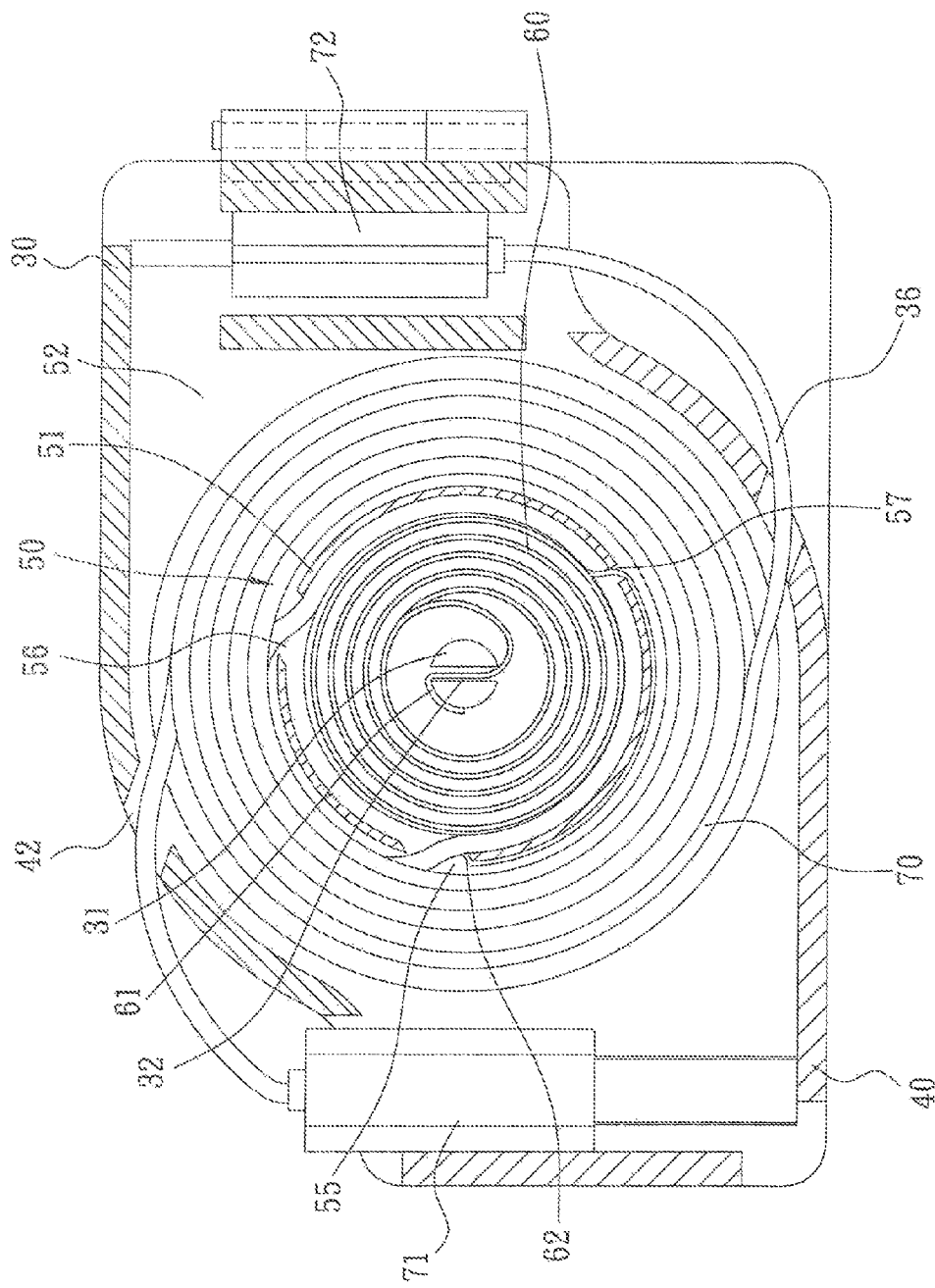
FIG. 4 is a cross sectional view showing the assembly of retractable cable combined with the smartphone/tablet holder according to the preferred embodiment of the present invention.

With reference to FIGS. 1 to 3, a retractable cable combined with a smartphone/tablet holder according to a preferred embodiment of the present invention comprises a roller 10 and a removable support 80 connected with the roller 10, wherein the roller 10 includes a casing 20, a rotatable disc 50, a spiral torsion spring 60, and a data transfer cable 70.

The removable support 80 includes a first fixing plate 91, a second fixing plate 95, a connection plate 81, and a plurality of shafts 85.

The casing 20 includes a first cover 30 and a second cover 40 which are connected together to define an accommodation space 21 so as to house the rotatable disc 50 in which the spiral torsion spring 60 is fixed, and the data transfer cable 70 inserts through and rolls on the rotatable disc 50.

The first cover 30 includes a central column 31 disposed on a central position and inserting through the rotatable disc 50, a slot 32 defined on a central position of the central column 31, a connecting piece 33 mounted on a front end thereof, and a connection block 34 arranged on a rear end thereof. The connecting piece 33 has plural first coupling pegs 331 arranged on a peripheral side thereof, the connection block 34 has plural orifices 341 defined on a peripheral side thereof, and a first cap 35 is formed on a bottom thereof and has a first recess 36 formed on a bottom thereof.

The second cover 40 includes a second cap 41 formed on a top thereof and having a second recess 42 defined on a front end thereof, plural apertures 401 defined on a front end thereof, a first joining sheet 43, a second joining sheet 44, a receiving space 45 defined between the first joining sheet 43 and the second joining sheet 44, a dovetail groove 46 formed on a rear end of the first joining sheet 43 so as to accommodate a dovetail protrusion 82, and plural second coupling pegs 47 arranged on a distal end of each of the first joining sheet 43 and the second joining sheet 44.

The rotatable disc 50 includes a cylindrical body 51, a hollow housing groove 52 defined therein, a through hole 53 formed on a central position thereof, a first trough 55 defined on a first side of the cylindrical body 51, a second trough 56 formed on a second side of the cylindrical body 51, and a third trough 57 arranged beside the first trough 55.

The spiral torsion spring 60 is housed in the housing groove 52 and includes a first segment 61 retained on the slot 32 of the central column 31, a second segment 62 engaged on the third trough 57 of the cylindrical body 51.

A first end of the data transfer cable 70 extends out of the first recess 36 through the cylindrical body 51 and the second trough 56, and a second end of the data transfer cable 70 extends out of the second recess 42 via the first trough 55 and the cylindrical body 51, such that the data transfer cable 70 rolls on the rotatable disc 50. The data transfer cable 70 includes a USB plug 71 fixed on the second end thereof and includes a terminal portion 72 secured on the first end thereof, wherein the USB plug 71 is accommodated beside the connecting piece 33 of the first cover 30, and the terminal portion 72 is housed on the second joining sheet 44 of the second cover 40.

The removable support 80 includes the dovetail protrusion 82 disposed on a middle portion of a front end of the connection plate 81, a first trench 83 defined on a first side thereof and rotatably connecting with the first fixing plate 91 by using the plurality of shafts 85, a second trench 84 formed on a second side thereof and rotatably connecting with the second fixing plate 95 by way of the plurality of shafts 85, wherein the first fixing plate 91 has a first rotary tab 92 formed on a rear end thereof and has a first notch 93 defined on a front end thereof, and the rotary tab 92 has a first opening 921 defined thereon; the second fixing plate 95 has a second rotary tab 96 formed on a rear end thereof and has a second notch 97 defined on a front end thereof, and the second rotary tab 96 has a second opening 961 defined thereon.

The roller 10 rolls the data transfer cable 70 into the casing 20, and the removable support 80 allows supporting a smartphone after removing from the roller 10, thus increasing using utility.

Referring to FIGS. 1 to 4, the central column 31 inserts into the rotatable disc 50, the housing groove 52 houses the spiral torsion spring 60, the first segment 61 of the spiral torsion spring 60 is retained on the slot 32 of the central column 31, the second segment 62 is engaged on the third trough 57 of the cylindrical body 51, the first end of the data transfer cable 70 extends out of the first recess 36 through the cylindrical body 51 and the second trough 56, and the second end of the data transfer cable 70 extends out of the second recess 42 via the first trough 55 and the cylindrical body 51, such that the data transfer cable 70 rolls on the rotatable disc 50. The data transfer cable 70 includes the USB plug 71 fixed on the second end thereof and includes the terminal portion 72 secured on the first end thereof, wherein the USB plug 71 is accommodated beside the connecting piece 33 of the first cover 30, and the terminal portion 72 is housed on the second joining sheet 44 of the second cover 40. As desiring to charge electricity, the terminal portion 72 is pulled outward and the data transfer cable 70 rolls on the cylindrical body 51 to drive the rotatable disc 50 to revolve, then the data transfer cable 70 is released so that the USD plug 71 and the terminal portion 72 are pulled outward, thereafter the spiral torsion spring 60 is rolled by the rotatable disc 50. As desiring to retract the data transfer cable 70, the USB plug 71 and the terminal portion 72 are removed from an electricity charger and a smartphone, the spiral torsion spring 60 releases so that the rotatable disc 50 rolls the data transfer cable 70 thereon.

Figure 5:
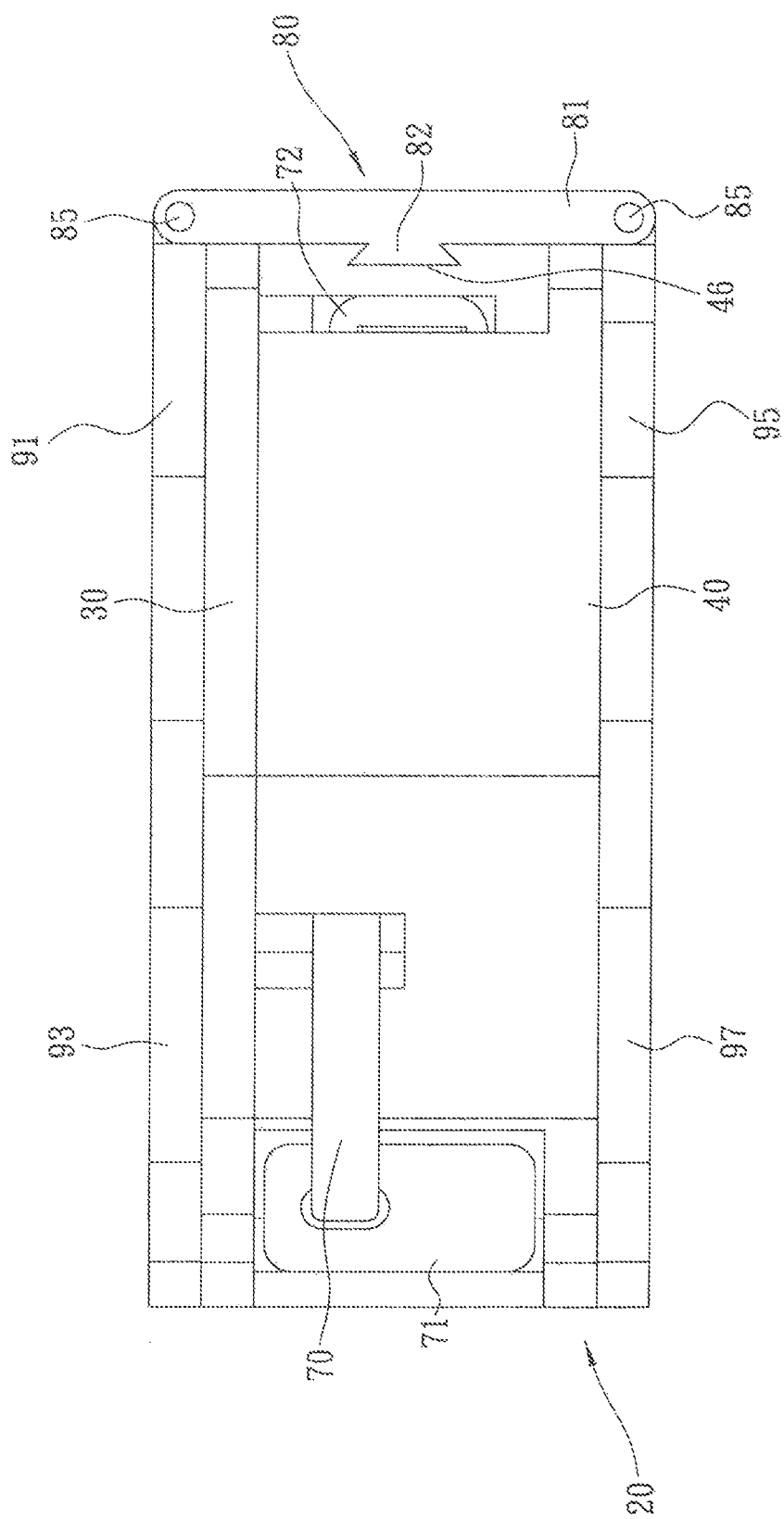
FIG. 5 is a side plan view showing the operation of the retractable cable combined with the smartphone/tablet holder according to the preferred embodiment of the present invention.
Figure 6:
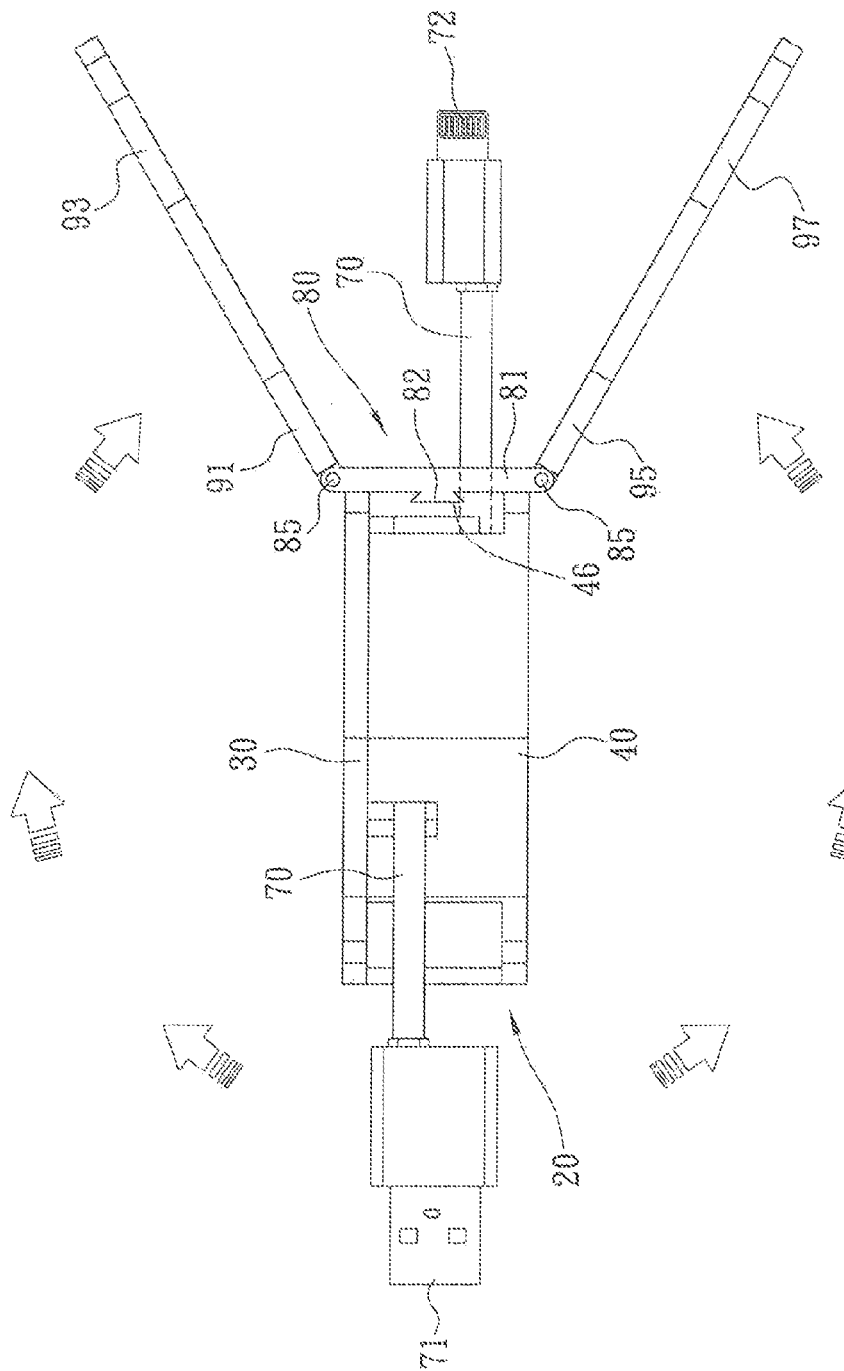
FIG. 6 is another side plan view showing the operation of retractable cable combined with the smartphone/tablet holder according to the preferred embodiment of the present invention.

As shown in FIGS. 5 and 6, the first fixing plate 91 and the second fixing plate 95 are rotated to a rear end of the casing 20 so as to form the smartphone/tablet holder for holding the smartphone. The first fixing plate 91 and the second fixing plate 95 are retraced beside the first cover 30 and the second cover 40. Preferably, the terminal portion 72 of the data transfer cable 70 matches with a USB slot of the smartphone or a tablet.

Figure 7:
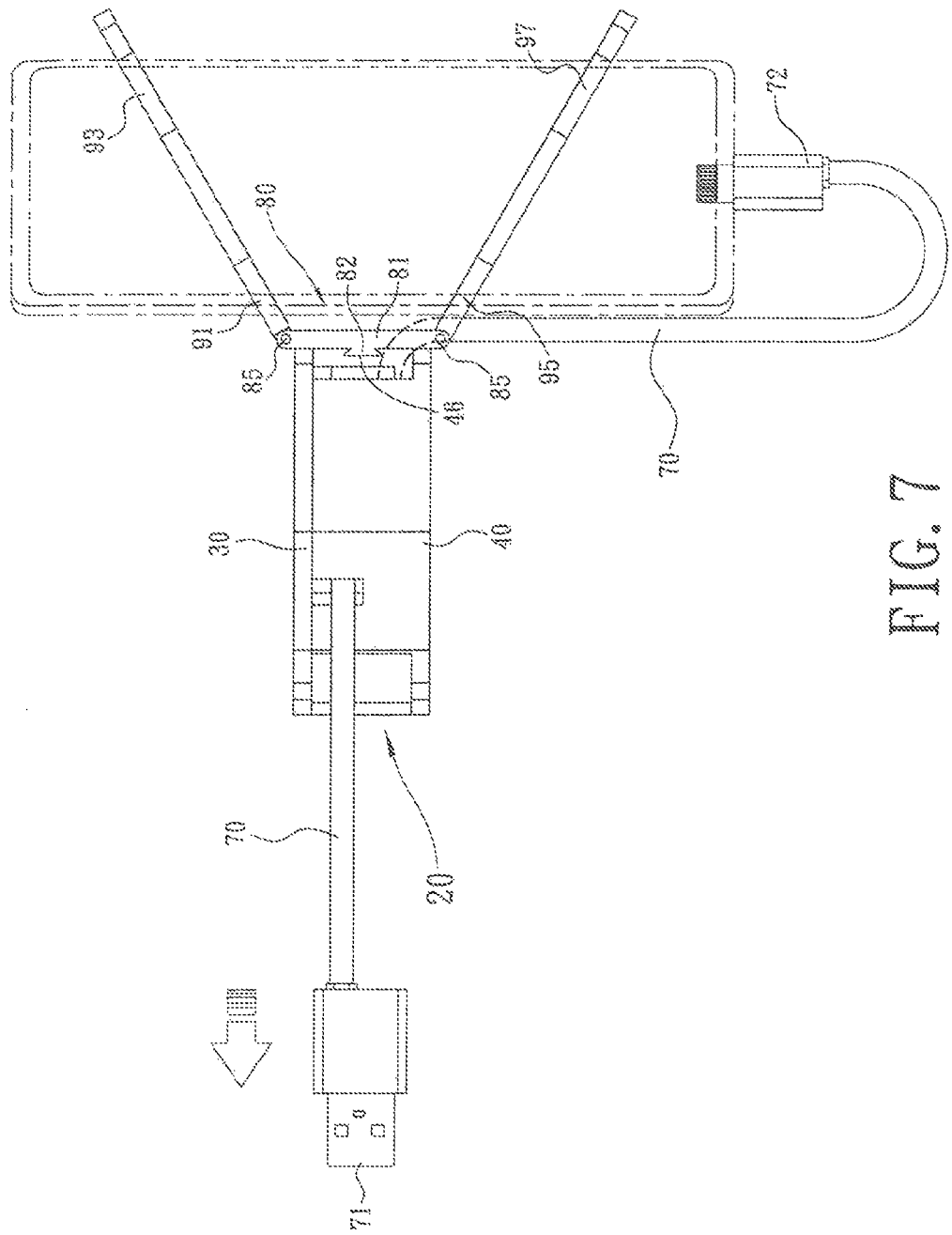
FIG. 7 is also another side plan view showing the operation of retractable cable combined with the smartphone/tablet holder according to the preferred embodiment of the present invention.
Figure 8:
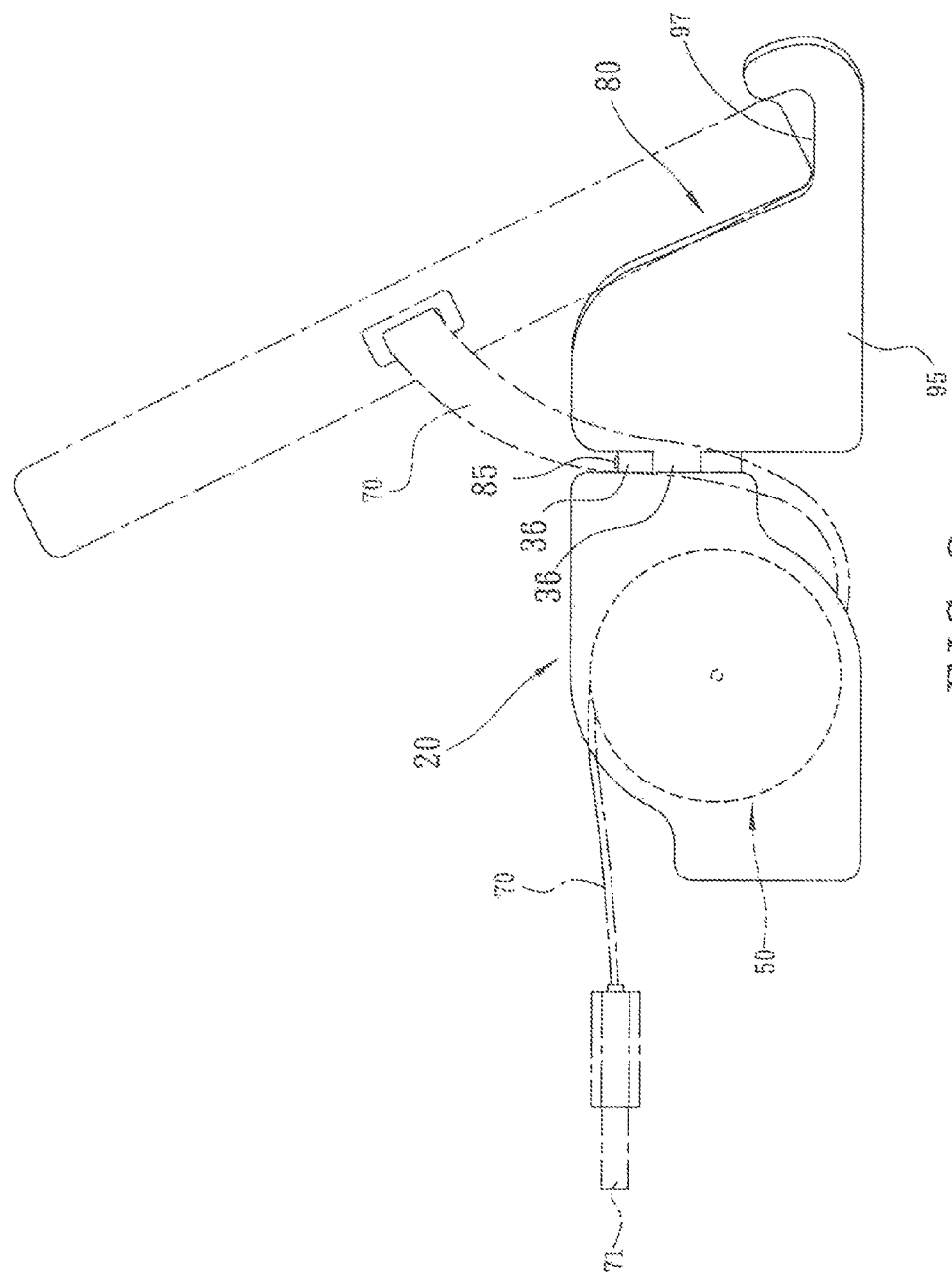
FIG. 8 is still another side plan view showing the operation of the retractable cable combined with the smartphone/tablet holder according to the preferred embodiment of the present invention.

As illustrated in FIGS. 7 and 8, the USB plug 71 is removed from a power connector or the USB slot, the terminal potion 72 is inserted on the smartphone. After the USB plug 71 and the terminal portion 72 are pulled outward, the USB plug 71 is inserted in a charging orifice of the electricity charger, and the terminal portion 72 is inserted into the USB slot of the smartphone.

Figure 9:
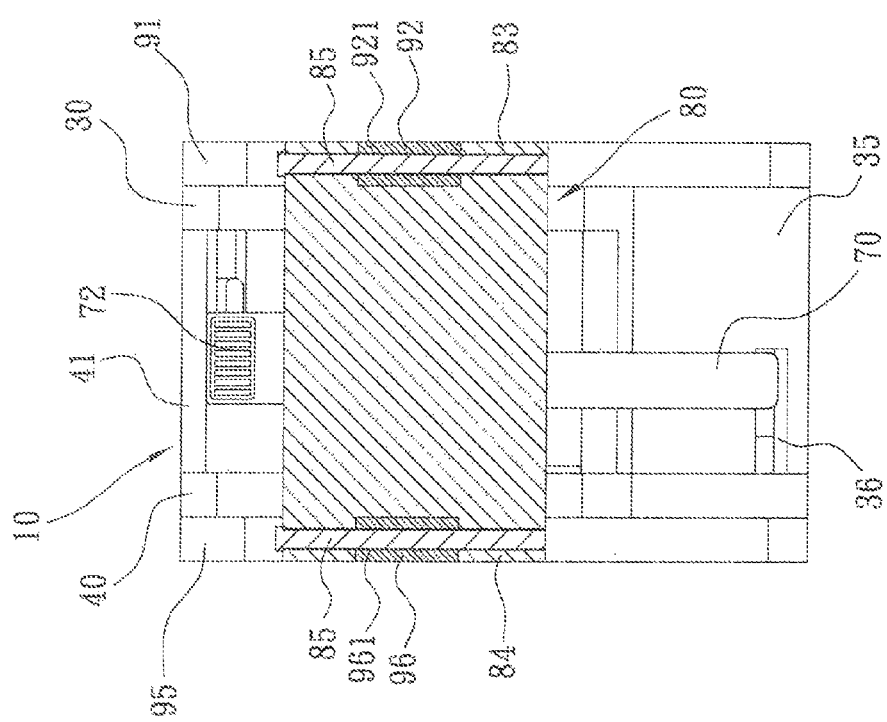
FIG. 9 is a cross sectional view showing the operation of the retractable cable combined with the smartphone/tablet holder according to the preferred embodiment of the present invention.
Figure 10:
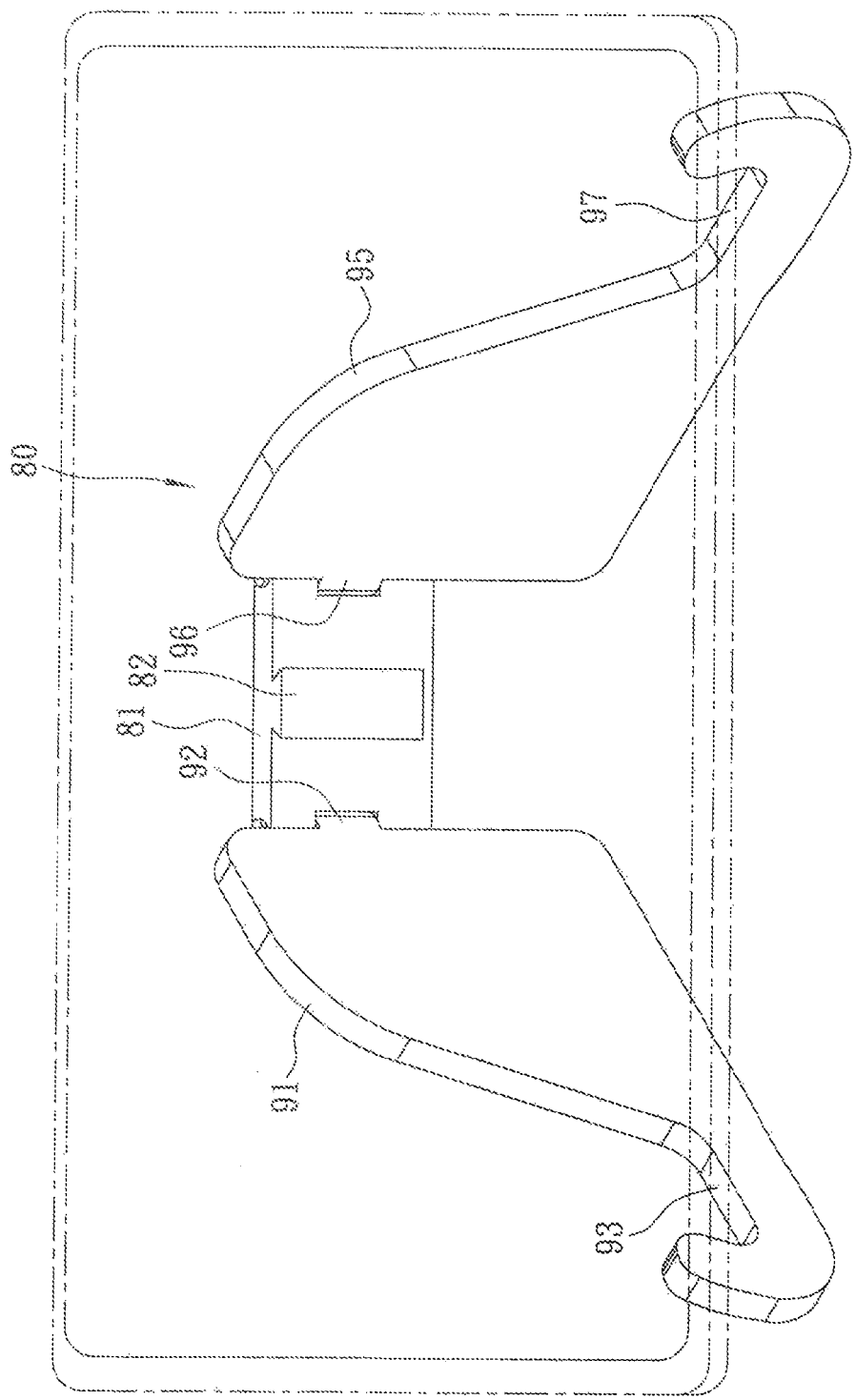
FIG. 10 is a perspective view showing the operation of the retractable cable combined with the smartphone/tablet holder according to the preferred embodiment of the present invention.

With reference to FIGS. 9 and 10, the dovetail protrusion 82 of the removable support 80 is inserted into the dovetail groove 46 of the first joining sheet 43, the first trench 83 is rotatably connected with the first fixing plate 91 by using the plurality of shafts 85, and the second trench 84 is rotatably connected with the second fixing plate 95 by way of the plurality of shafts 85. After the removable support 80 is removed from the roller 10, it allows being used as the smartphone holder, and the roller 10 rolls the data transfer cable 70 into the casing 20.

Preferably, the smartphone holder of the present invention is adapted for Data/Power/Audio/Video/Image except for USB terminal, and the data transfer cable is provided with various terminals so as to replace required mobile derives, such as smartphones and tablets.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A retractable cable combined with a smartphone/tablet holder comprising: a roller and a removable support connected with the roller, and the roller including a casing, a rotatable disc, a spiral torsion spring, and a data transfer cable; wherein the removable support includes a first fixing plate, a second fixing plate, a connection plate, and a plurality of shafts;

the casing includes a first cover and a second cover which are connected together to define an accommodation space so as to house the rotatable disc in which the spiral torsion spring is fixed, and the data transfer cable inserts through and rolls on the rotatable disc;

the first cover includes a central column disposed on a central position and inserting through the rotatable disc, a slot defined on a central position of the central column, a connecting piece mounted on a front end thereof, and a connection block arranged on a rear end thereof; the connecting piece has plural first coupling pegs arranged on a peripheral side thereof, the connection block has plural orifices defined on a peripheral side thereof, and a first cap is formed on a bottom thereof and has a first recess formed on a bottom thereof;

the second cover includes a second cap formed on a top thereof and having a second recess defined on a front end thereof, plural apertures defined on a front end thereof, a first joining sheet, a second joining sheet, a receiving space defined between the first joining sheet and the second joining sheet, a dovetail groove formed on a rear end of the first joining sheet so as to accommodate a dovetail protrusion, and plural second coupling pegs arranged on a distal end of each of the first joining sheet and the second joining sheet;

the rotatable disc includes a cylindrical body, a hollow housing groove defined therein, a through hole formed on a central position thereof, a first trough defined on a first side of the cylindrical body, a second trough formed on a second side of the cylindrical body, and a third trough arranged beside the first trough;

the spiral torsion spring is housed in the housing groove and includes a first segment retained on the slot of the central column, a second segment engaged on the third trough of the cylindrical body;

a first end of the data transfer cable extends out of the first recess through the cylindrical body and the second trough, and a second end of the data transfer cable extends out of the second recess via the first trough and the cylindrical body, such that the data transfer cable rolls on the rotatable disc; the data transfer cable includes a USB plug fixed on the second end thereof and includes a terminal portion secured on the first end thereof;

the removable support includes the dovetail protrusion disposed on a middle portion of a front end of the connection plate, a first trench defined on a first side thereof and rotatably connecting with the first fixing plate by using the plurality of shafts, a second trench formed on a second side thereof and rotatably connecting with the second fixing plate by way of the plurality of shafts, wherein the first fixing plate has a first rotary tab formed on a rear end thereof and has a first notch defined on a front end thereof, and the rotary tab has a first opening defined thereon; the second fixing plate has a second rotary tab formed on a rear end thereof and has a second notch defined on a front end thereof, and the second rotary tab has a second opening defined thereon.

2. The retractable cable combined with the smartphone/tablet holder as claimed in claim 1, wherein the USB plug is accommodated beside the connecting piece of the first cover, and the terminal portion is housed on the second joining sheet of the second cover.

3. The retractable cable combined with the smartphone/tablet holder as claimed in claim 1 wherein the terminal portion of the data transfer cable matches with a USB slot of a smartphone.

4. The retractable cable combined with the smartphone/tablet holder as claimed in claim 1, wherein the terminal portion of the data transfer cable matches with a USB slot of a tablet.

* * * * *